United States Patent

Pechmeze et al.

[11] 4,043,751
[45] Aug. 23, 1977

[54] PROCESS FOR COLORING FIBERS WITH WATER-INSOLUBLE POLYFLUORO AZO DYESTUFFS

[75] Inventors: Jacques Pierre Edmond Pechmeze, Paris; Robert Frederic Michel Sureau, Enghien les Bains, both of France

[73] Assignee: Produits Chimiques Ugine Kuhlmann, Paris, France

[21] Appl. No.: 628,722

[22] Filed: Nov. 4, 1975

Related U.S. Application Data

[62] Division of Ser. No. 416,913, Nov. 19, 1973, abandoned.

[30] Foreign Application Priority Data

Nov. 17, 1972  France ............... 72.40827

[51] Int. Cl.² .......... C09B 27/00; D06P 1/02
[52] U.S. Cl. ................... 8/41 C; 260/152; 260/157; 260/163; 260/186; 260/190; 260/191
[58] Field of Search ........... 8/41 C, 41 R; 260/163, 260/186, 190, 191

[56] References Cited

U.S. PATENT DOCUMENTS

| 2,516,106 | 7/1950 | Dickey | 260/577 |
|---|---|---|---|
| 2,516,302 | 7/1950 | Dickey | 260/207.5 |
| 2,516,303 | 7/1950 | Dickey | 260/207.5 |
| 3,017,421 | 1/1962 | Cohen | 260/577 |

Primary Examiner—Joseph L. Schofer
Assistant Examiner—A. L. Clingman
Attorney, Agent, or Firm—Beveridge, DeGrandi, Kline, Lunsford

[57] ABSTRACT

Process for coloration of synthetic or artificial fibers with water-insoluble dyes stuffs of the formula:

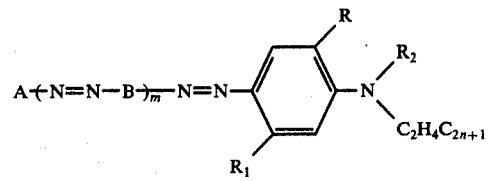

in which R represents hydrogen, alkyl or alkoxy, $R_1$ represents hydrogen, chlorine, alkyl, alkoxy or acylamino or a diene grouping linked to the benzene nucleus to form a naphthalene nucleus, $R_2$ represents hydrogen, alkyl, hydroxyalkyl or cyanoethyl, $n$ represents 2, B represents an aromatic radical, $m$ is 0 or 1 and A represents a benzene or heterocyclic radical, the residues A and B being unsubstituted or substituted by substituents which do not give rise to an acid dissociation.

4 Claims, No Drawings

PROCESS FOR COLORING FIBERS WITH WATER-INSOLUBLE POLYFLUORO AZO DYESTUFFS

This is a division, of application Ser. No. 416,913 filed Nov. 19, 1973, now abandoned.

The invention relates to new water-insoluble polyfluoroazo dyestuffs, which may be used for the colouration of textile fibres, especially synthetic or artificial fibres.

According to the present invention therefore polyfluoroazo dyestuffs are provided having the general formula:-

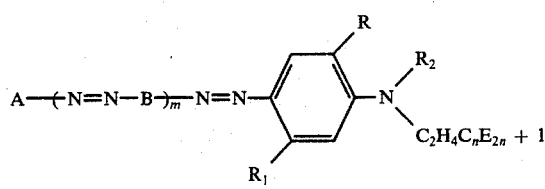

(I)

in which R represents hydrogen, alkyl or alkoxy, $R_1$ represents hydrogen, chlorine, an alkyl, alkoxy or acylamino or a diene grouping linked to the benzene nucleus to form a naphthalene nucleau, $R_2$ represents hydrogen, alkyl, hydroxyalkyl or cyanoethyl, n represents 2, B represents an aromatic radical, for example a benzene or naphthalene nucleus, $m$ is 0 or 1, and A represents a benzene or heterocyclic radical.

The radicals A and B have no substituents giving rise to an acid dissociation, such as for example sulphonic or carboxylic groups. They may however be substituted by halogen atoms or alkyl, alkoxy, nitro, cyano, alkylsulphonyl, sulphonamido or acylamino groups. The alkoxy and alkyl groups, including therein those of the hydroxyalkyl, alkylsulphonyl and acylamino groups, are preferably groups containing 1 to 5 carbon atoms. The radical A may contain a maximum of three substituents and the radical B may contain a maximum of two substituents (in positions 2 and 5) and one of these may be a diene group forming a naphthalene ring with the benzene ring.

Non-fluorinated dyestuffs of the general formula:-

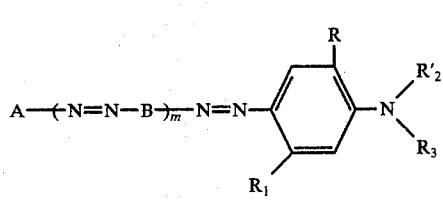

(II)

in which A, B, R, $R_1$ and m have the same significance as above, and $R_2$, $R_2'$ and $R_3$ represent alkyl, hydroxyalkyl or cyanoethyl have already been proposed for the colouration of synthetic or artificial fibres.

In comparison with their non-fluorinated homologues, the new dyestuffs according to the invention are characterised by a displacement of their maximum absorption towards the shortest wavelengths and by improved fastness to light and sublimation.

The new dyestuffs may be prepared for example by coupling the diazo derivative of an amine of the general formula:-

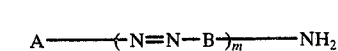

(III)

in which A, B and m have the same significance as above, with a coupling component of the general formula:

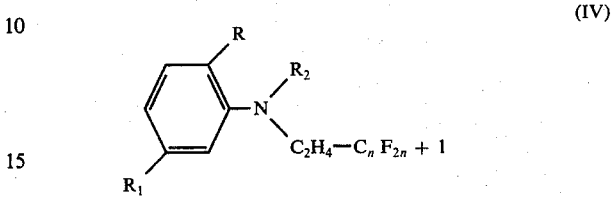

(IV)

wherein R, $R_1$, $R_2$ and n have the same significance as above.

Such coupling components have been described in our United States Application Ser. No. 414,592, filed on November 9, 1973 for "Polyfluoroalkylarylamines and their processes or preparation". (Our references 9.C and A772/P).

The amines of the formula: A-N=N-B-NH$_2$ may be prepared for example by coupling the diazo derivative of an amine of formula A-NH$_2$ with an amine of formula B-NH$_2$.

Among the heterocyclic amines of formula A-NH$_2$ may be mentioned, for example, 3-amino-1,2,4-triazole, 2-amino-benzothiazole, 3-amino-5-phenyl-pyrazole and 3-amino-indazole.

The dyestuffs according to the invention are suitable for the colouration of synthetic fibres, such as fibres based on polyesters, and of artificial fibres such as those based on cellulose acetate or triacetate.

The colouration may be effected under the same conditions as with the conventional plastosoluble dyestuffs. When the dyestuff has been put in a finely dispersed form, the dyeing of polyester fibres may be effected either under superatmospheric pressure at a temperature between 120° C. and 140° C. or at the boiling point of the dyebath at ordinary pressure in the presence of a carrier.

In the following Examples, which are purely illustrative, the parts are parts by weight unless the contrary is indicated.

EXAMPLE 1

16.3 parts of 2-amino-5-nitro-benzonitrile are dissolved in 92 parts by volume of concentrated sulphuric acid. The solution is cooled to 0° C. and a solution of acid nitrosyl sulphate, obtained by mixing 7.6 parts of sodium nitrite with 92 parts by volume of sulphuric acid is run in with stirring. After introduction of the acid nitrosyl sulphate, the mass is diluted in 364 parts by volume of orthophosphoric acid (d=1.7), while maintaining the temperature at 0°–5° C. Stirring is continued for two hours at 0°–5° C., 12 parts of urea are added, the mixture is stirred for fifteen minutes and the acid solution is poured on a mixture comprising 2000 parts by volume of distilled water and crushed ice.

The clear solution of the diazonium salt thus obtained is slowly added, with stirring, to a solution of 30.6 parts of N-cyanoethyl-N-(3,3,4,4,4-pentafluoro-butyl)m-toluidine, in 400 parts by volume of glacial acetic acid. During the addition of the diazonium salt, the pH of the mixture is maintained at 4 to 4.5 by the simultaneous addition of sodium actate.

other hand, it has been found that their fastness to light is distinctly superior.

TABLE 1

| EX | Y | Z | $R_1$ | $R_2$ | A | Crystallisation solvent | | C | H | N | F | Cl or Br |
|---|---|---|---|---|---|---|---|---|---|---|---|---|
| 2 | $NO_2$ | H | $CH_3$ | $C_2H_5$ | F | toluene | cal. | 52,74 | 3,95 | 15,38 | 20,88 | — |
|  |  |  |  |  |  |  | found | 52,4 | 4,18 | 15,1 | 20,4 |  |
| 3 | $NO_2$ | H | H | $C_2H_4CN$ | F | " | cal. | 51,51 | 3,22 | 18,02 | 20,38 | — |
|  |  |  |  |  |  |  | found | 51,7 | 3,46 | 17,5 | 20,0 |  |
| 4 | $NO_2$ | H | H | $C_2H_5$ | F | " | cal. | 51,70 | 3,63 | 15,87 | 21,54 | — |
|  |  |  |  |  |  |  | found | 51,7 | 3,72 | 15,3 | 20,9 |  |
| 5 | Cl | H | H | $C_2H_4CN$ | F | " | cal. | 52,69 | 3,29 | 15,36 | 20,35 | 7,79 |
|  |  |  |  |  |  |  | found | 52,4 | 3,52 | 15,2 | 20,4 | 7,68 |
| 6 | Cl | H | $CH_3$ | $C_2H_4CN$ | F | acetic acid | cal. | 53,67 | 3,62 | 14,91 | 20,33 | 7,56 |
|  |  |  |  |  |  |  | found | 53,5 | 3,60 | 15,0 | 20,5 | 7,73 |
| 7 | $NO_2$ | Br | H | $C_2H_4CN$ | F | " | cal. | 45,58 | 2,46 | 15,64 | 21,22 | 7,93 |
| 8 | $NO_2$ | H | Cl | H | F | cyclohexane | found | 44,9 | 2,65 | 15,2 | 20,8 | 8,1 |
| 9 | $NO_2$ | Br | Cl | H | F | cyclohexane | cal. | 38,74 | 1,90 | 13,29 | 18,04 | 6,74 15,19 |
|  |  |  |  |  |  |  | found | 38,4 | 1,96 | 13,3 | 18,1 | 6,3 15,9 |
| 10 | Cl | H | Cl | H | F | " | cal. | 46,68 | 2,51 | 12,81 | 21,74 | 16,24 |
|  |  |  |  |  |  |  | found | 46,5 | 2,4 | 12,7 | 21,0 | 16,0 |
| 11 | $NO_2$ | H | Cl | $C_2H_4CN$ | F | toluene | cal. | 47,95 | 2,79 | 16,78 | 18,98 | 7,09 |
|  |  |  |  |  |  |  | found | 48,5 | 3,0 | 16,1 | 18,4 | 6,3 |
| 12 | $NO_2$ | Br | Cl | $C_2H_4CN$ | F | " | cal. | 41,41 | 2,24 | 14,49 | 14,39 | 6,12-13,80 |
|  |  |  |  |  |  |  | found | 41,0 | 2,4 | 13,7 | 15,9 | 6,0-14,0 |
| 13 | Cl | H | Cl | $C_2H_4CN$ | F | " | cal. | 48,98 | 2,85 | 14,28 | 19,38 | 14,49 |
|  |  |  |  |  |  |  | found | 48,2 | 3,0 | 13,5 | 19,2 | 14,2 |
| 14 | $NO_2$ | $NO_2$ | Cl | $C_2H_4CN$ | F | " | cal. | 43,99 | 2,39 | 17,96 | 17,41 | 6,50 |
|  |  |  |  |  |  |  | found. | 43,2 | 2,6 | 17,2 | 16,7 | 6,9 |

When the coupling is completed, the dyestuff precipitates, and it is filtered off, washed with distilled water until the mineral salts are completely eliminated, and dried. 41 parts i.e. a yield of 85.4%, of the dyestuff consisting of [2-cyano-4-nitro-benzene]- <1 azo 4>-[3-methyl-N-cyanoethyl-N-(3,3,4,4,4-pentafluoro-butyl)-1-amino-benzene] are obtained.

After crystallisation from toluene, elementary analysis gave the following result:

| Found | C = 52.6% | H = 3.71% | N = 17.4% | F = 19.7% |
|---|---|---|---|---|
| Calculated | 52.5 | 3.54 | 17.50 | 19.79 |

30 parts of the dyestuff thus obtained are ground with 70 parts of the lignosulphonate (a dispersing agent) known under the trade mark "Reax 80 C" (produced by Westvaco, Chemical Division North Charleston, South Carolina), 500 parts by volume of Ottawa sand and 400 parts of water until a fineness of the order of a micron is obtained. The dispersion is separated from the sand and dried in an oven at 50° C. The dyestuff thus dispersed dyes fibres based on polyesters a very bright red, of which the fastness to light is excellent.

Under the same conditions, the corresponding dyestuff contained the butyl radical instead of the $C_2H_4$-$C_2F_5$ radical dyes fibres based on polyester a red shade, which is distinctly more blue and the fastness to light of which is very inferior.

In Table (i) below a number of Examples of dyestuffs obtained by the process of Example 1 are listed, of formula:

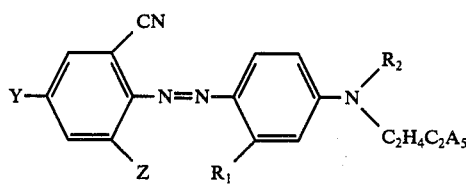

As is evident from Table (II) below, the shades obtained on fibres based on polyesters with the fluorinated dyestuffs (A=F) are different from those of the corresponding non-fluorinated dyestuffs (A=H). On the Table II

| | Shades on polyester-fibres | |
|---|---|---|
| Example | Fluorinated dyestuff (A=F) | Non-fluorinated dyestuff (A=H) |
| 2 | bordeaux | violet |
| 3 | scarlet | red |
| 4 | red | bordeaux |
| 5 | yellow | orange-yellow |
| 6 | yellow | orange |
| 7 | red | bluish-red |
| 8 | orange | brown |
| 9 | red | chestnut |
| 10 | yellow | orange-yellow |
| 11 | scarlet | red |
| 12 | red | bordeaux |
| 13 | yellow | orange-yellow |
| 14 | bordeaux | violet |

EXAMPLE 15

19.7 parts of p-amino-azobenzene are dissolved in 300 parts by volume of a normal solution of hydrochloric acid. The solution is cooled to 0°-5° C. and 50 parts by volume of a normal aqueous solution of sodium nitrite are slowly run in. The mixture is stirred for an hour at 0°-5° C. and the excess of sodium nitrite is then destroyed by the addition of an aqueous solution of sulphamic acid.

The solution of the diazonium salt is slowly run into a solution of 28.1 parts of N-ethyl-N-(3,3,4,4,4-pentafluorobutyl)-m-toluidine in 200 parts by volume of glacial acetic acid, the medium being maintained at about pH 4.5 by the addition of sodium acetate.

The dyestuff is precipitated, and it is filtered off, washed with distilled water until the mineral salts are completely eliminated, and dried. 33 parts are obtained, i.e. a yield of 67.5% of the dyestuff consisting of [4-phenylazobenzene]- <1 azo 4> -[3-methyl-N-ethyl-N-(3,3,4,4,4-pentafluoro-butyl)-1-amino-benzene] of which the elementary analysis, carried out after crystallisation from cyclohexane, was as follows:

| Calculated: | C = 61.35% | H = 4.90% | N = 14.31% | F = 19.42% |
|---|---|---|---|---|
| Found: | 60.9 | 4.9 | 14.3 | 19.4 |

When dispersed by the method given in Example 1, it dyes polyester fibres a scarlet shade.

EXAMPLE 16

18.2 parts of 3-amino-indazole are suspended in 125 parts by volume of distilled water and 25 parts by volume of concentrated hydrochloric acid ($d=1.18$). The suspension is cooled to between 0° C. and 5° C. and 50 parts by volume of a 2N aqueous solution of sodium nitrite are gradually introduced.

After stirring for an hour at 0°-5° C. the excess of nitrite is destroyed by the addition of 15 parts by volume of a normal solution of sulphamic acid. The suspension of diazonium chloride is diluted with 750 parts by volume of distilled water to obtain a clear solution. This solution is gradually added to a solution of 28.1 parts of N-ethyl-N-(3,3,4,4,4-pentafluoro-butyl)-m-toluidine in 200 parts by volume of acetic acid, the medium being maintained at about pH 4.5 by the addition of sodium acetate. The dyestuff is precipitated, and it is filtered off, washed with distilled water until mineral salts are completely eliminated, and dried.

34 parts, i.e. a yield of 80%, are obtained of the dyestuff consisting of [N-ethyl-N-(3,3,4,4,4-pentafluorobutyl)-4-amino-2-methyl]-3-phenylazo-indazole, of which the elementary analysis, after crystallisation from cyclohexane, is as follows:

| Calculated: | C = 56.47% | H = 4.70% | N = 16.47% | F = 22.35% |
|---|---|---|---|---|
| Found: | 55.7 | 4.75 | 16.7 | 22.2 |

After dispersion according to the process of Example 1, this dyestuff dyes fibres based on polyester a golden yellow shade.

Under the same conditions, the corresponding non-fluorinated dyestuff dyes fibres based on polyester a yellow shade, more reddish than that of the fluorinated dyestuff, with an inferior fastness to light.

EXAMPLE 17

15 parts of 2-amino-benzothiazole are dissolved in 160 parts by volume of distilled water and 130 parts by volume of concentration sulphuric acid. The solution is cooled to 0° C., 50 parts by volume of a 2N aqueous solution of sodium nitrite are added in a period of one and a half hours, then stirring is carried out for 2 1/2 hours at 0° C. 2 parts of sulphamic acid are added, and stirring is continued for 15 minutes.

The solution of the diazonium sulphate is run slowly into a solution of 29.2 parts of N-cyanoethyl-N-(3,3,4,4,4-pentafluoro-butyl)aniline in 200 parts by volume of acetic acid, the medium being buffered by the addition of sodium acetate. The dyestuff is precipitated, and it is filtered off, washed with distilled water until mineral salts are completely eliminated, and dried.

31 parts are obtained, i.e. a yield of 68% of the dyestuff consisting of [N-(cyanoethyl)-N-(3,3,4,4,4-pentafluorobutyl)-4-amino ]-2-phenylazo-benzothiazole, the elementary analysis of which, after crystallisation from cyclohexane, is as follows:

After dispersion according to the process described in Example 1, this dyestuff dyes fibres based on polyester an orange-yellow shade.

Under the same conditions, the corresponding non-fluorinated dyestuff dyes fibres based on polyester on orange shade of inferior fastness to light.

EXAMPLE 18

16 parts of 3-amino-5-phenyl-pyrazole are diazotised by the process described in Example 1. Coupling is effected with 28.1 parts of N-ethyl-N-(3,3,4,4,4-pentafluorobutyl)-m-toluidine. 36 parts are obtained, i.e. a yield of 79.9%, of the dyestuff consisting of [N-ethyl-N-(3,3,4,4,4-pentafluoro-butyl)-4-amino-2-methyl]-3-phenylazo-5-phenylpyrazole of which the analysis, after crystallisation from cyclohexane, gives the following results:

| Calculated: | C=58.5% | H=4.88% | N=15.51% | F=21.06% |
|---|---|---|---|---|
| Found: | 58.0 | 5.07 | 15.11 | 20.8 |

The dyestuff, dispersed according to the process of Example 1, dyes fibres based on polyester a yellow shade.

The corresponding non-fluorinated dyestuff dyes polyester fibres a yellow shade, distinctly redder than that of the fluorinated dyestuff, and of inferior fastness to light.

EXAMPLE 19

8.5 parts of 3-amino-1,2,4-triazole are diazotised according to the process of Example 1. The diazonium salt obtained is coupled with 29.2 parts of N-cyanoethyl-N-(3,3,4,4,4-pentafluoro-butyl)aniline. 36 parts i.e. a yield of 93%, of the dyestuff consisting of [N-(cyanoethyl)-N-(3,3,4,4,4-pentafluoro-butyl)4-amino]-3-phenylazo-1,2,4-triazole are obtained, of which the elementary analysis, after recrystallisation from cyclohexane, is as follows:

| Calculated: | C=46.51% | H=3.62% | N=25.32% | F=24.54% |
|---|---|---|---|---|
| Found: | 45.9 | 3.76 | 24.6 | 24.4 |

The dyestuff, dispersed according to the process of Example 1, dyes fibres based on polyester a yellow shade. The corresponding non-fluorinated dyestuff dyes the polyester fibres a yellow shade with an inferior fastness to light.

EXAMPLE 20

17.8 parts of 3-amino-5-nitro-indazole are dissolved in 300 parts by volume of orthophosphoric acid ($d=1.7$). The solution is cooled to 0° C. and 7 parts of sodium nitrite are added in a period of an hour, then the mixture is stirred for 2 hours at 0° C.

The diazonium salt obtained is added slowly to a solution of 28.1 parts of N-ethyl-N-(3,3,4,4,4-pentafluorobutyl)-m-toluidine in 200 parts by volume of acetic acid, the medium being buffered by the simultaneous addition of sodium acetate. After stirring for two hours at the ambient temperature, the product is diluted with 500 parts by volume of distilled water and the insoluble

| Calculated: | C = 52.98% | H = 3.53% | N = 15.45% | F = 20.97% | S = 7.06% |
|---|---|---|---|---|---|
| Found: | 52.1 | 3.59 | 15.6 | 20.6 | 7.71 | dyestuff is filtered off. It is washed with distilled water until mineral salts are completely eliminated, and dried.

31 parts are obtained, i.e. a yield of 66%, of the dyestuff consisting of [N-ethyl-N-(3,3,4,4,4-pentafluorobutyl)4-amino-2-methyl]-3-phenylazo-5-nitroindazole, of which the elementary analysis, after crystallisation from toluene, gives the following results:

| Calculated: | C=51.06% | H=4.04% | N=17.87% | F=20.21% |
|---|---|---|---|---|
| Found: | 50.4 | 4.2 | 17.4 | 20.2 |

The dyestuff, dispersed as in Example 1, dyes fibres based on polyester an orange-yellow shade. The corresponding non-fluorinated dyestuff dyes the polyester fibres brownyellow with inferior fastness to light.

We claim:

1. Process for the coloration of fibers based on polyester, said process comprising coloring said fiber with a dyestuff of the formula:

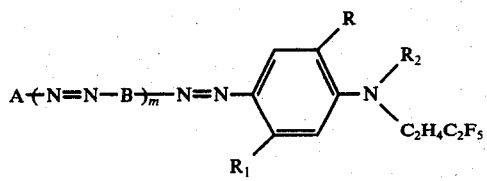

in which R represents hydrogen, alkyl or alkoxy, $R_1$ represents hydrogen, chlorine, alkyl, alkoxy or acylamino or a diene grouping linked to the benzene nucleus to form a naphthalene nucleus, $R_2$ represents hydrogen, alkyl, hydroxyalkyl or cyanoethyl, B represents an aromatic radical, $m$ is 0 or 1 and A represents a benzene or hetercyclic radical, the residues A and B being unsubstituted or substituted by substituents which do not give rise to an acid dissociation. --

2. Process according to claim 1 wherein B is a benzene or naphthalene nucleus.

3. Process according to claim 1 wherein polyester fibres are dyed under superatmospheric pressure at a temperature from 120° C. to 140° C.

4. Process according to claim 1 wherein polyester fibres are dyed at the boiling point of the dyebath at ordinary pressure in the presence of a carrier.

* * * * *